United States Patent
Sun et al.

(10) Patent No.: US 9,886,010 B2
(45) Date of Patent: Feb. 6, 2018

(54) METHOD AND APPARATUS FOR CONTROLLING VOLTAGE IN NEAR DIRECT CURRENT AREA

(71) Applicant: Tsinghua University, Beijing (CN)

(72) Inventors: Hongbin Sun, Beijing (CN); Qinglai Guo, Beijing (CN); Bin Wang, Beijing (CN); Boming Zhang, Beijing (CN); Wenchuan Wu, Beijing (CN); Fengda Xu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 335 days.

(21) Appl. No.: 14/839,943

(22) Filed: Aug. 29, 2015

(65) Prior Publication Data

US 2016/0087437 A1 Mar. 24, 2016

(30) Foreign Application Priority Data

Aug. 29, 2014 (CN) .......................... 2014 1 0437080

(51) Int. Cl.
  *G05B 13/04* (2006.01)
  *H02J 3/00* (2006.01)
  *H02J 3/18* (2006.01)
  *H02J 3/36* (2006.01)
  (Continued)

(52) U.S. Cl.
  CPC .............. *G05B 13/048* (2013.01); *H02J 3/00* (2013.01); *H02J 3/18* (2013.01); *H02J 3/36* (2013.01); *F03D 7/028* (2013.01); *F03D 7/045* (2013.01); *H02J 2003/003* (2013.01); *H02J 2003/007* (2013.01); *Y02E 10/723* (2013.01); *Y02E 40/30* (2013.01); *Y02E 60/60* (2013.01); *Y02E 60/76* (2013.01); *Y04S 10/54* (2013.01); *Y04S 40/22* (2013.01)

(58) Field of Classification Search
  CPC ... G05B 13/048; H02J 3/00; H02J 3/18; H02J 3/36; H02J 2003/003; H02J 2003/007; Y02E 10/723; Y02E 60/60; Y02E 40/30; Y02E 60/76; F03D 7/028; F03D 7/045; Y04S 40/22; Y04S 10/54
  See application file for complete search history.

(56) References Cited

U.S. PATENT DOCUMENTS

| | | | |
|---|---|---|---|
| 2002/0008982 A1* | 1/2002 | Jiang-Hafner | H02J 3/36 363/148 |
| 2007/0055392 A1* | 3/2007 | D'Amato | G05B 13/048 700/44 |

(Continued)

*Primary Examiner* — Sean Shechtman
*Assistant Examiner* — Tri T Nguyen
(74) *Attorney, Agent, or Firm* — Kile Park Reed & Houtteman LLC (57) ABSTRACT

The present disclosure relates to a method and an apparatus for controlling a voltage in a near direct current area. The method includes: collecting measured values of parameters as initial values of prediction values of the parameters; inputting the initial values into a preset control model for optimizing a model predictive control; solving the preset control model to obtain a solution sequence of the terminal voltage setting values of the generators participating in the voltage control within a time window; and sending first values in the solution sequence to the generators, such that the voltage control in the near direct current area is realized.

20 Claims, 1 Drawing Sheet

(51) Int. Cl.
    *F03D 7/02* (2006.01)
    *F03D 7/04* (2006.01)

(56) References Cited

U.S. PATENT DOCUMENTS

| | | | |
|---|---|---|---|
| 2012/0033461 A1* | 2/2012 | Papafotiou | H02J 3/36 363/35 |
| 2013/0166084 A1* | 6/2013 | Sedighy | G06Q 50/06 700/291 |
| 2015/0115721 A1* | 4/2015 | Norrga | H02J 3/38 307/82 |
| 2015/0219074 A1* | 8/2015 | Babazadeh | F03D 7/048 290/44 |

* cited by examiner

METHOD AND APPARATUS FOR CONTROLLING VOLTAGE IN NEAR DIRECT CURRENT AREA

CROSS-REFERENCE TO RELATED APPLICATION

This application claims priority to and benefits of Chinese Patent Application No. 201410437080.7, filed with the State Intellectual Property Office of P. R. China on Aug. 29, 2014, the entire contents of which are incorporated herein by reference.

FIELD

The present disclosure relates to a method and an apparatus for controlling a voltage in a near direct current area of a power system, and an apparatus for controlling a voltage in a near direct current area of a power system.

BACKGROUND

With the continuous development of the national economy, electricity consumptions of traditional heavy loads continue to grow. If the loads are far away from the power center, the electricity is transmitted between regional power systems with a high power. Interconnection ways of the power systems have been widely applied, such as long distance transmission lines of UHVDC (ultra-high voltage direct current), long distance transmission lines of UHVAC (ultra-high voltage alternating current) and back to back DC (direct current) transmission systems.

It may be seen from field operations that, there are weak grids of near direct current areas at receiving ends in DC interconnection systems. In the near direct current areas, voltage levels are determined by power flows and electrodes in the area are closely associated. When DC transmission ways between the regional power systems change, active power flows in the near areas will change hugely; in addition, because converter stations are usually equipped with large-capacity filter capacitors, large reactive power excitations are generated when switching the capacitors. Thus, the voltages in convertor stations of the near direct current areas may fluctuate drastically, which is very unfavorable for a safe operation of the power system.

Currently, methods for participating in regional automatic voltage controls of the near direct current areas are relatively limited, which mainly include a method of using reactive powers of adjacent power plants and a method of switching capacitors and reactors in the convertor station. In the convertor station, only local voltage is controlled. Operation data shows that when the DC transmission power changes, the filter capacitors in the convertor station operate frequently, such that the system voltage may fluctuate drastically. The traditional voltage controls are mainly based on a system state at a single-time section, which cannot effectively respond to the mutual influences of varieties of reactive power compensation devices in the areas in a long process.

SUMMARY

According to a first aspect of embodiments of the present disclosure, there is provided a method for controlling a voltage in a near direct current area, in which the method is applied in a control of an automatic voltage control system in a master station of a power system and includes: collecting measured values of parameters as initial values of prediction values of the parameters, in which the prediction values comprise voltage prediction values of pilot buses, a voltage prediction value of a bus in a convertor station, a first active power prediction value which is a sum of active power prediction values of loads in the convertor station, a first reactive power prediction value which is a sum of reactive power prediction values of the loads in the convertor station, an input amount of capacitors and reactors in the convertor station, terminal voltage prediction values of generators participating in a voltage control active power prediction values of the generators and reactive power prediction values of the generators; inputting the initial values into a preset control model for optimizing a model predictive control, in which the preset control model comprises an objective function and constraint conditions, the objective function is a function established according to the voltage prediction values of the pilot buses and the terminal voltage prediction values of the generators, and configured to optimize terminal voltage setting values of generators, the constraint conditions comprise a first constraint condition of the reactive power prediction values of the generators, a second constraint condition of the voltage prediction values of the pilot buses, the voltage prediction value of the bus in the convertor station, the terminal voltage prediction values of the generators, a third constraint condition of the input amount of the capacitors and reactors in the convertor station, a fourth constraint condition of an input amount of filter capacitors under a constant reactive power mode, a fifth constraint condition of a number of actions of the capacitors and reactors and a sixth constraint condition of a system voltage, the reactive power prediction values of the generators and the input amount of the capacitors and reactors in the convertor station; solving the preset control model to obtain a solution sequence of the terminal voltage setting values of the generators within a time window; sending first values in the solution sequence to the generators, such that the voltage control in the near direct current area is realized.

According to a second aspect of embodiments of the present disclosure, there is provided an apparatus for controlling a voltage in a near direct current area, in which the apparatus is applied in a control of an automatic voltage control system in a master station of a power system and includes: a processor; and a memory for storing instructions executable by the processor;

in which the processor is configured to collect measured values of parameters as initial values of prediction values of the parameters, in which the prediction values comprise voltage prediction values of pilot buses, a voltage prediction value of a bus in a convertor station, a first active power prediction value which is a sum of active power prediction values of loads in the convertor station, a first reactive power prediction value which is a sum of reactive power prediction values of the loads in the convertor station, an input amount of capacitors and reactors in the convertor station, terminal voltage prediction values of generators participating in a voltage control, active power prediction values of the generators and reactive power prediction values of the generators;

input the initial values into a preset control model for optimizing a model predictive control, in which the preset control model comprises an objective function and constraint conditions, the objective function is a function established according to the voltage prediction values of the pilot buses and the terminal voltage prediction values of the generators, and configured to optimize terminal voltage setting values of the generators, the constraint conditions comprise a first constraint condition of the reactive power prediction values of the generators, a second constraint condition of the voltage prediction values of the pilot buses, the voltage prediction value of the bus in the convertor station, the terminal voltage prediction values of the generators, a third constraint condition of the input amount of the capacitors and reactors in the convertor station, a fourth constraint condition of an input amount of filter capacitors under a constant reactive power mode, a fifth constraint condition of a number of actions of the capacitors and reactors and a sixth constraint condition of a system voltage, the reactive power prediction values of the generators and the input amount of the capacitors and reactors in the convertor station;

solve the preset control model to obtain a solution sequence of the terminal voltage setting values of the generators within a time window;

send first values in the solution sequence to the generators, such that the voltage control in the near direct current area is realized.

According to a third aspect of embodiments of the present disclosure, there is provided a non-transitory computer-readable storage medium having stored therein instructions that, when executed by a processor of a computer, causes the computer to perform the method for controlling a voltage in a near direct current area according to the first aspect of embodiments of the present disclosure.

The technical solutions provided by embodiments of the present disclosure have following advantageous effects.

In the technical solutions of the present disclosure, a switching prediction model of the reactive powers of the generators and the capacitors and reactors in the convertor station is designed, which may estimate state changes of the voltage in the near direct current area during a period of time. Compared to the conventional method of using the current state as a control criterion, it is possible to achieve a coordination of the variety of continuous reactive devices and discrete reactive devices during operation. The method for controlling a voltage in a near direct current area according to embodiments of the present disclosure may be integrated into the automatic voltage control system in the control center, such that the system may respond to the load fluctuations and changes of the DC transmission ways in the near direct current area.

It is to be understood that both the foregoing general description and the following detailed description are exemplary and explanatory only and are not restrictive of the invention, as claimed.

BRIEF DESCRIPTION OF THE DRAWINGS

In order to explicitly illustrate embodiments of the present disclosure, a brief introduction for the accompanying drawings corresponding to the embodiments will be listed as follows. Apparently, the drawings described below are only corresponding to some embodiments of the present disclosure, and those skilled in the art may obtain other drawings according to these drawings without creative labor.

Embodiments of the present disclosure have already been illustrated with reference to above drawings, and will be described more detail in the following description. These drawings and text description are not intended to limit the scope of the present disclosure in any way, but are used to explain the concept of the present disclosure to those skilled in the art with reference to special embodiments.

DETAILED DESCRIPTION

In order to make objectives, technical solutions and advantages of the present disclosure clearer, in the following the present disclosure will be described in detail with reference to drawings. Apparently, the described embodiments are only some embodiments of the present disclosure and do not represent all the embodiments. Based on the embodiment described herein, all the other embodiments obtained by those skilled in the art without creative labor belong to the protection scope of the present disclosure.

Figure 1:
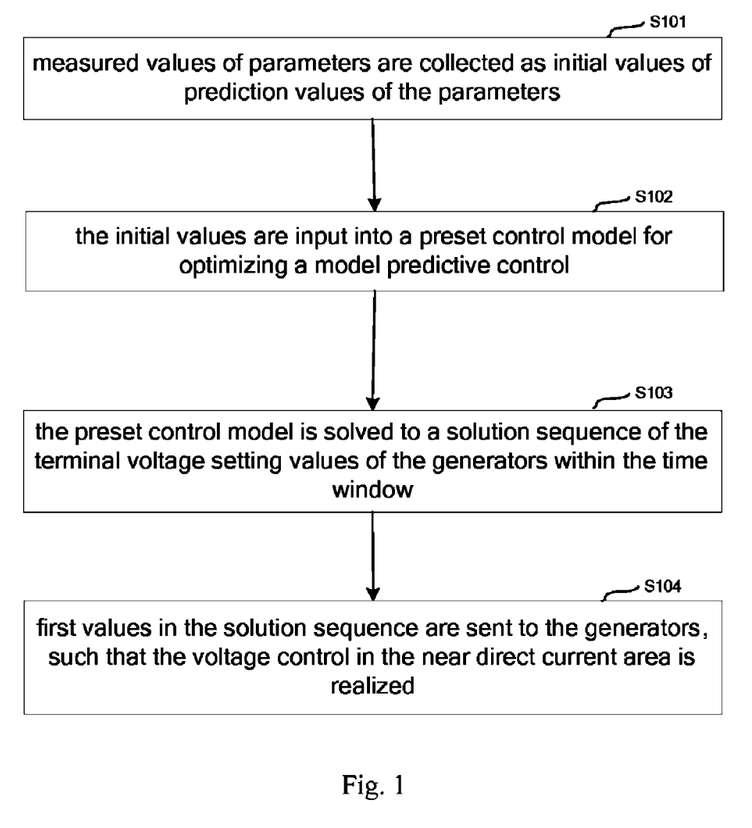
FIG. 1 is a flow chart of a method for controlling a voltage in a near direct current area according to an exemplary embodiment.

FIG. 1 is a flow chart of a method for controlling a voltage in a near direct current area according to an exemplary embodiment. The method is applied in a control of an automatic voltage control (AVC) system in a master station of a power system. As shown in FIG. 1, in a control cycle, the method includes following steps.

In step S101, measured values of parameters are collected as initial values of prediction values of the parameters, in which the prediction values include voltage prediction values $V_{Pilot}^{pre}$ of pilot buses, a voltage prediction value $V_{St}^{pre}$ of a bus in a convertor station, a first active power prediction value $P_{St}^{pre}$ which is a sum of active power prediction values of loads in the convertor station, a first reactive power prediction value $Q_{St}^{pre}$ which is a sum of reactive power prediction values of the loads in the convertor station, an input amount $N_{St}^{pre}$ of capacitors and reactors in the convertor station, terminal voltage prediction values $V_G^{pre}$ of generators participating in a voltage control, active power prediction values $P_G^{pre}$ of the generators and reactive power prediction values $Q_G^{pre}$ of the generators.

In an embodiment of the present disclosure, the first active power prediction value $P_{St}^{pre}$, the first reactive power prediction value $Q_{St}^{pre}$ and the active power prediction values $P_G^{pre}$ of the generators are evaluated according to a generation schedule and a load forecasting result.

In step S102, the initial values are input into a preset control model for optimizing a model predictive control.

The preset control model includes an objective function and constraint conditions; the objective function is a function established according to the voltage prediction values of the pilot buses and the terminal voltage prediction values of the generators, and configured to optimize terminal voltage setting values of the generators; the constraint conditions include a first constraint condition of the reactive power prediction values of the generators, a second constraint condition of the voltage prediction values of the pilot buses, the voltage prediction value of the bus in the convertor station, the terminal voltage prediction values of the generators, a third constraint condition of the input amount of the capacitors and reactors in the convertor station, a fourth constraint condition of an input amount of filter capacitors under a constant reactive power mode, a fifth constraint condition of a number of actions of the capacitors and reactors and a sixth constraint condition of a system voltage, the reactive power prediction values of the generators and the input amount of the capacitors and reactors in the convertor station.

In some embodiments, the method further includes establishing the preset control model (not shown in FIG. 1).

The model predictive control (MPC) is an important method in the Process Control Theory, and is widely applied in many industries such as petroleum industries, chemical industries, metallurgy industries, machinery industries. In the power system, the MPC is mainly used in the field of grid voltage control, the field of stabilizing voltage, the field of active power scheduling, the field of stored energy management, etc., and has the advantages in control effect and robustness. The current control action of the MPC is obtained by solving a finite horizon open-loop optimal control problem at every sampling moment. The current state of the process is used as the initial state of the optimal control, and the optimal control sequence only performs the first control action.

Firstly, the objective function is established according to formula (1):

$$\min_{V_G^{set}} \sum_{i=0}^{N-1} \sum_{j=0}^{M-1} \rho^{i,j} F_1 \tag{1}$$

where $V_G^{set}$ set represents the terminal voltage setting values of the generators, N represents a number of control cycles covered by the time window (a control cycle of the AVC system in the typical master station is 5 min, and in this embodiment N may be 6), M represents a number of predicted points in a single control cycle (which is used to refine change process of system states in the time scale), $\rho$ represents an attenuation coefficient, $\rho<1$, $t_{i,j}=(Mi+j)\Delta t$ represents a prediction time corresponding to a $(j+1)^{th}$ predicted point in a $(i+1)^{th}$ control cycle from a current time, $\Delta t$ represents a time interval between prediction time corresponding to each two adjacent predicted points (which is determined according to the amount of calculation. The smaller the time interval is, the greater the amount of calculation is. In an embodiment, the time interval is set to be 1 min, and M is 5). $F_1$ represents a distance between the voltage prediction values of the pilot buses and voltage reference values of the pilot buses, in which $F_1$ is denoted by formula (2):

$$F_1(t_{i,j}) = \|V_{Pilot}^{pre}(t_{i,j}) - V_{Pilot}^{ref}\|^2 \tag{2}$$

where $F_1(t_{i,j})$ represents a distance between the voltage prediction values of the pilot buses and voltage reference values of the pilot buses at the prediction time $t_{i,j}$, $V_{Pilot}^{Pre}(t_{i,j})$ represents the voltage prediction values of the pilot buses at the prediction time $t_{i,j}$, $V_{Pilot}^{ref}$ represents the voltage reference values of the pilot buses, in which the voltage reference values of the pilot buses are set manually, and are not exceeding upper limits and lower limits set for the pilot buses in the area.

(1) A first constraint condition of the reactive power prediction values of the generators, the first constraint condition is denoted by formula (6):

$$Q_G^{ref}(t_{i,j}) = \tag{6}$$

$$K_P[V_G^{pre}(t_{i,j}) - V_G^{set}(t_{i,0})] + K_I \Delta t \sum_{k=0}^{i \times M + j} [V_G^{pre}(t_{i,j-k}) - V_G^{set}(t_{i,-k})] +$$

$$Q_G^{pre}(t_{0,0}) - K_P[V_G^{pre}(t_{0,0}) - V_G^{set}(t_{0,0})]$$

$$Q_G^{pre}(t_{i,j}) = Q_G^{ref}(t_{i,j-1}) + [Q_G^{pre}(t_{i,j-1}) - Q_G^{ref}(t_{i,j-1})]e^{-(t_{i,j} - t_{i,j-1})/T_d}$$

The constraint condition of reactive power reference values of the generators is denoted by a formula of $$Q_G^{ref}(t_{i,j}) = K_P[V_G^{pre}(t_{i,j}) - V_G^{set}(t_{i,0})] + K_I \Delta t \sum_{k=0}^{i \times M + j} [V_G^{pre}(t_{i,j-k}) - V_G^{set}(t_{i,-k})] +$$

$$Q_G^{pre}(t_{0,0}) - K_P[V_G^{pre}(t_{0,0}) - V_G^{set}(t_{0,0})]$$

where $Q_G^{ref}(t_{i,j})$ represents reactive power reference values of the generators at the prediction time $t_{i,j}$, $V_G^{pre}(t_{i,j-k})$ represents the terminal voltage prediction values of the generators at a prediction time $t_{i,j-k}$, $t_{i,j-k}=(Mi+j-k)\Delta t$, $t_{i,j-k}$ represents a prediction time corresponding to a $(j-k)^{th}$ predicted point in the $i^{th}$ control cycle, $V_G^{set}(t_{i,-k})$ represents the terminal voltage setting values of the generators at a prediction time $t_{i,-k}$, $t_{i,-k}=(Mi-k)\Delta t$, $Q_G^{pre}(t_{0,0})$ represents reactive power prediction values of the generators at a current time $t_{0,0}$, $V_G^{pre}(t_{0,0})$ represents the terminal voltage prediction values of the generators at the current time $t_{0,0}$, $V_G^{pre}(t_{0,0})$ represents the terminal voltage setting values of the generators at the current time $t_{0,0}$, $K_I$ represents coefficients in a proportion calculation, $K_P$ represents coefficients in an integral calculation, $K_I$ and $K_P$ are determined according to control coefficients of generator excitation regulators. If the reactive power reference values are beyond a range $[Q_G^{min}, Q_G^{max}]$ bounded by upper limits and lower limits of the reactive powers of the generators, $K_I$ and $K_P$ are set to values close to the lower limits or the upper limits).

The reactive power prediction values of the generators are denoted by a formula of $$Q_G^{pre}(t_{i,j}) = Q_G^{ref}(t_{i,j-1}) + [Q_G^{pre}(t_{i,j-1}) - Q_G^{ref}(t_{i,j-1})]e^{-(t_{i,j} - t_{i,j-1})/T_d}$$

where $Q_G^{pre}(t_{i,j})$ is a component of $Q_G^{pre}(t_{i,j})$ and represents a reactive power prediction value of a generator at the prediction time $t_{i,j}$, $Q_G^{pre}(t_{i,j})$ represents the reactive power prediction values of the generators at the prediction time $t_{i,j}$, $Q_G^{ref}(t_{i,j-1})$ is a component of and $Q_G^{ref}(t_{i,j-1})$ represents a reactive power reference value of the generator at a prediction time $t_{i,j-1}$, $Q_G^{ref}(t_{i,j-1})$ represents the reactive power reference values of the generators at the prediction time $t_{i,j-1}$, $Q_G^{pre}(t_{i,j-1})$ is a component of $Q_G^{pre}(t_{i,j-1})$ and represents a reactive power prediction value of the generator at the prediction time $t_{i,j-1}$, $Q_G^{pre}(t_{i,j-1})$ represents the reactive power prediction values of the generators at the prediction time $t_{i,j-1}$, $t_{i,j-1}$ represents a prediction time corresponding to a $(j-1)^{th}$ predicted point in the $i^{th}$ control cycle, $T_d$ represents an action delay of a generator excitation regulator.

(2) The second constraint condition is denoted by formula (7):

$$V^{pre}(t_{i,j}) - V^{pre}(t_{0,0}) = S\begin{bmatrix} P_G^{pre}(t_{i,j}) - P_G^{pre}(t_{0,0}) \\ Q_G^{pre}(t_{i,j}) - Q_G^{pre}(t_{0,0}) \\ -P_{St}^{pre}(t_{i,j}) + P_{St}^{pre}(t_{0,0}) \\ -Q_{St}^{pre}(t_{i,j}) + Q_{St}^{pre}(t_{0,0}) + Q_{St}^C[N_{St}^{pre}(t_{i,j}) - N_{St}^{pre}(t_{0,0})] \end{bmatrix} \tag{7}$$

where $V^{pre}(t_{i,j})$ represents a vector composing of the voltage prediction values of the pilot buses, the voltage prediction value of the bus in the convertor station and the terminal voltage prediction values of generators at the prediction time $t_{i,j}$, $V^{pre}(t_{0,0})$ represents the vector composing of the voltage prediction values of the pilot buses, the voltage prediction value of the bus in the convertor station and the terminal voltage prediction values of the generators at the current time $t_{0,0}$, S represents a sensitivity matrix (which is obtained after linearizing power flow equations), $P_G^{pre}(t_{i,j})$ represents the active power prediction values of the generators at the prediction time $t_{i,j}$, $P_G^{pre}(t_{0,0})$ represents the active power prediction values of the generators at the current time $t_{0,0}$, $Q_G^{pre}(t_{0,0})$ represents the reactive power prediction values of the generators at the current time $t_{0,0}$, $P_{St}^{pre}(t_{i,j})$ represents the first active power prediction value at the prediction time $t_{i,j}$, $P_{St}^{pre}(t_{0,0})$ represents the first active power prediction value at the current time $t_{0,0}$, $Q_{St}^{pre}(t_{i,j})$ represents the first reactive power prediction value at the prediction time $t_{i,j}$, $Q_{St}^{pre}(t_{0,0})$ represents the first reactive power prediction value at the current time $t_{0,0}$, the loads in the convertor station include pole equivalent loads in a direct current end of the convertor station, and may be obtained by searching for a schedule, $Q_{St}^C$ represents a capacitance of a single capacitor, $N_{St}^{pre}(t_{i,j})$ represents the input amount of the capacitors and reactors in the convertor station at the prediction time $t_{i,j}$ and $N_{St}^{pre}(t_{0,0})$ represents the input amount of the capacitors and reactors in the convertor station at the current time $t_{0,0}$, if the resistance devices come into service, $N_{St}^{pre}(t_{0,0})$ are negative values.

(3) The third constraint condition is denoted by formula (8):

$$\hat{V}^{pre}(t_{i,j}) - V^{pre}(t_{0,0}) = \qquad (8)$$

$$S \begin{bmatrix} P_G^{pre}(t_{i,j}) - P_G^{pre}(t_{0,0}) \\ Q_G^{pre}(t_{i,j}) - Q_G^{pre}(t_{0,0}) \\ -P_{St}^{pre}(t_{i,j}) + P_{St}^{pre}(t_{0,0}) \\ -Q_{St}^{pre}(t_{i,j}) + Q_{St}^{pre}(t_{0,0}) + Q_{St}^C[N_{St}^{pre}(t_{i,j}) - N_{St}^{pre}(t_{0,0})] \end{bmatrix}$$

$$N_{St}^{pre}(t_{i,j}) = \begin{cases} N_{St}^{pre}(t_{i,j-1}) - 1, & \hat{V}_{St}^{pre} > V_{St}^{max} \\ N_{St}^{pre}(t_{i,j-1}) + 1, & \hat{V}_{St}^{pre} < V_{St}^{min} \\ N_{St}^{pre}(t_{i,j-1}), & \text{else} \end{cases}$$

According to this third constraint condition, in the convertor station with a local voltage control strategy, a group of reactors come into when the voltages are beyond the upper limits but go out of service when the voltages are beyond the lower limits. While the capacitors come into when the voltages are beyond the lower limits but go out of service when the voltages are beyond the upper limits. First, voltage levels may be calculated before an action of the capacitors and reactors according to a formula of $$\hat{V}^{pre}(t_{i,j}) - V^{pre}(t_{0,0}) =$$

$$S \begin{bmatrix} P_G^{pre}(t_{i,j}) - P_G^{pre}(t_{0,0}) \\ Q_G^{pre}(t_{i,j}) - Q_G^{pre}(t_{0,0}) \\ -P_{St}^{pre}(t_{i,j}) + P_{St}^{pre}(t_{0,0}) \\ -Q_{St}^{pre}(t_{i,j}) + Q_{St}^{pre}(t_{0,0}) + Q_{St}^C[N_{St}^{pre}(t_{i,j-1}) - N_{St}^{pre}(t_{0,0})] \end{bmatrix}$$

where $\hat{V}^{pre}(t_{i,j})$ represents a vector composing of the voltage prediction values of the pilot buses, the voltage prediction value of the bus in the convertor station and the terminal voltage prediction values of the generators at the prediction time $t_{i,j}$ before an action is performed by the capacitors and reactors, S represents a sensitivity matrix, $N_{St}^{pre}(t_{i,j-1})$ represents the input amount of the capacitors and reactors in the convertor station at the prediction time $t_{i,j-1}$, $\hat{V}_{St}^{pre}$ represents a component in $\hat{V}^{pre}$ and represents the voltage prediction value of the bus in the convertor station before the action is performed by the capacitors and reactors.

Then, the input amount of the capacitors and reactive resistors in the convertor station is calculated by a formula of $$N_{St}^{pre}(t_{i,j}) = \begin{cases} N_{St}^{pre}(t_{i,j-1}) - 1, & \hat{V}_{St}^{pre} > V_{St}^{max} \\ N_{St}^{pre}(t_{i,j-1}) + 1, & \hat{V}_{St}^{pre} < V_{St}^{min} \\ N_{St}^{pre}(t_{i,j-1}), & \text{else} \end{cases}$$

where $V_{St}^{max}$ represents an upper limit of the voltage prediction value of the bus in the convertor station, $V_{St}^{min}$ represents a lower limit of the voltage prediction value of the bus in the convertor station, the logic constraint in this formula are converted into a linear constraint including integer variables in the optimization calculation.

(4) The fourth constraint condition is denoted by formula (9):

$$\hat{Q}_{St,out}^{pre} = -Q_{St}^{pre}(t_{i,j}) + Q_{St}^C N_{St}^{pre}(t_{i,j-1}) \qquad (9)$$

$$N_{St}^{pre}(t_{i,j}) = \begin{cases} N_{St}^{pre}(t_{i,j-1}) - 1, & \hat{Q}_{St,out}^{pre} > Q_{St,out}^{max} \\ N_{St}^{pre}(t_{i,j-1}) + 1, & \hat{Q}_{St,out}^{pre} < Q_{St,out}^{min} \\ N_{St}^{pre}(t_{i,j-1}), & \text{else} \end{cases}$$

The constraint condition of a total reactive power injected into the power system by a converter station before an action of the filter capacitors is denoted by a formula of $$\hat{Q}_{St,out}^{pre} = -Q_{St}^{pre}(t_{i,j}) + Q_{St}^C N_{St}^{pre}(t_{i,j-1})$$

where $\hat{Q}_{St,out}^{pre}$ represents a total reactive power injected into the power system by the converter station before an action of the filter capacitors.

The input amount of the filter capacitors in the convertor station (i.e. the input amount of the capacitors and reactive resistors) under a constant reactive power mode is calculated by a formula of $$N_{St}^{pre}(t_{i,j}) = \begin{cases} N_{St}^{pre}(t_{i,j-1}) - 1, & \hat{Q}_{St,out}^{pre} > Q_{St,out}^{max} \\ N_{St}^{pre}(t_{i,j-1}) + 1, & \hat{Q}_{St,out}^{pre} < Q_{St,out}^{min} \\ N_{St}^{pre}(t_{i,j-1}), & \text{else} \end{cases}.$$

where $Q_{St,out}^{max}$ represents an upper limit of the total reactive power injected into the power system by the converter station before an action of the filter capacitors, $Q_{St,out}^{min}$ represents a lower limit of the total reactive power injected into the power system by the converter station before an action of the filter capacitors. A logical constraint in the above formula may be converted into a linear constraint including integer variables in the optimization calculation.

(5) The fifth constraint condition is denoted by formula (10):

$$-O_{St}^{pre}(t_{i,j}) \leq N_{St}^{pre}(t_{i,j}) - N_{St}^{pre}(t_{i,j-1}) \leq O_{St}^{pre}(t_{i,j}) \quad (10)$$

$$\sum_{i=0}^{N-1} \sum_{j=0}^{M-1} O_{St}^{pre}(t_{i,j})_1 \leq O_{St}^{max}$$

The constraint condition of a number of actions of the capacitors and reactive resistors is denoted by a formula of $$-O_{St}^{pre}(t_{i,j}) \leq N_{St}^{pre}(t_{i,j}) - N_{St}^{pre}(t_{i,j-1}) \leq O_{St}^{pre}(t_{i,j})$$

where $O_{St}^{pre}(t_{i,j})$ is an indicator indicating whether the capacitors and reactive resistors are static at the prediction time $t_{i,j}$ and this action variable is a variable of 0 or 1.

The constraint condition of a number of actions of the capacitors and reactive resistors in a MPC time window is denoted by a formula of $$\sum_{i=0}^{N-1} \sum_{j=0}^{M-1} O_{St}^{pre}(t_{i,j})_1 \leq O_{St}^{max}$$

where $O_{St}^{max}$ represents an upper limit of the number of actions of the capacitors and reactive resistors and is determined combining the number of actions of the capacitors and reactive resistors before the optimization in the same day.

(6) The sixth condition is denoted by formula (11)

$$\begin{cases} V^{min} \leq V^{pre}(t_{i,j}) \leq V^{max} \\ Q_G^{min} \leq Q_G^{pre}(t_{i,j}) \leq Q_G^{max} \\ N_{St}^{min} \leq N_{St}^{pre}(t_{i,j}) \leq N_{St}^{max} \end{cases} \quad (11)$$

where $V^{max}$ represents upper limits of the vector composing of the voltage prediction values of the pilot buses, the voltage prediction value of the bus in the convertor station and the terminal voltage prediction values of the generators, $V^{min}$ represents lower limits of the vector composing of the voltage prediction values of the pilot buses, the voltage prediction value of the bus in the convertor station and the terminal voltage prediction values of the generators, $Q_G^{max}$ represents upper limits of the reactive power prediction values of the generators, $Q_G^{min}$ a represents lower limits of the reactive power prediction values of the generators, $N_{St}^{max}$ represents an upper limit of the input amount of the capacitors and reactive resistors and $N_{St}^{min}$ represents a lower limit of the input amount of the capacitors and reactive resistors (the upper limit is equal to a number of the capacitors and reactive resistors, and the lower limit is equal to an opposite number of the number of the capacitors and reactive resistors).

The preset control model may be established according to the above objective function and constraint conditions.

However, for simplicity, the above objective function and constraint conditions may be simplified.

Since the generators usually have entered a steady state within the time interval between the prediction time corresponding to each two predicted points of the model predictive control, the generators have been adjusted in place, such that the terminal voltages reach the setting values, or the reactive powers reach the limits.

So the first constraint condition may be removed and then formula (3) is added into the objective function. The formula (3) is expressed as $$\min \sum_{i=0}^{N-1} \sum_{j=0}^{M-1} \rho^{t_{i,j}} F_2 \quad (3)$$

where $F_2$ represents a distance between of the terminal voltage prediction values of the generators and terminal voltage setting values of the generators; and is denoted by formula (4):

$$F_2(t_{i,j}) = \|V_G^{pre}(t_{i,j}) - V_G^{set}(t_{i,0})\|^2 \quad (4)$$

where $F_2(t_{i,j})$ represents a distance between the terminal voltage prediction values of the generators and terminal voltage setting values of the generators at the predication time $t_{i,j}$, $V_G^{pre}(t_{i,j})$ represents the terminal voltage prediction values of the generators at the predication time $t_{i,j}$, $V_G^{set}(t_{i,0})$ represents the terminal voltage setting values of the generators at a prediction time $t_{i,0}$, $t_{i,0}$ represents a prediction time corresponding to a first predicted point in the $(i+1)^{th}$ control cycle.

So, the simplified objective function may be denoted by formula (5):

$$\min \sum_{i=0}^{N-1} \sum_{j=0}^{M-1} \rho^{t_{i,j}}(F_1 + wF_2) \quad (5)$$

where w represents a weight corresponding to $F_2$.

In step S103, the preset control model is solved to a solution sequence of the terminal voltage setting values of the generators within the time window.

Specifically, the preset control model is solved by optimization tools (such as Cplex, Mosek etc.) to obtain a solution sequence of $V_G^{set}$ within the time window (the model is a quadratic programming problem of the mixed integers and can be quickly solved).

In step S104, first values in the solution sequence are sent to the generators, such that the voltage control in the near direct current area is realized.

In other words, the first values in $V_G^{set}$ are used as control targets to be sent to the generators.

In the present disclosure, an action is performed by a device (a capacitor or a reactor) means that the device comes into or goes out of service.

The embodiments providing an apparatus of the present disclosure are as follows. The apparatus is used to implement the method according to the embodiments of the present disclosure. Concerning the details which are not described in the embodiments of the device, reference is made to the embodiments of the method.

Figure 2:
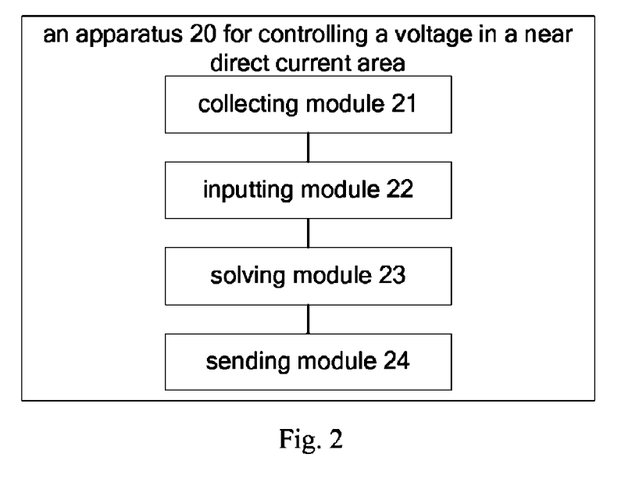
FIG. 2 is a block diagram of an apparatus for controlling a voltage in a near direct current area according to an exemplary embodiment.

The apparatus is applied in a control of an automatic voltage control system in a master station of a power system. As shown in FIG. 2, the apparatus 20 includes a collection module 21, an inputting module 22, a solving module 23 and a sending module 24.

The collection module 21 is configured to collect measured values of parameters as initial values of prediction values of the parameters, wherein the prediction values comprise voltage prediction values of pilot buses, a voltage prediction value of a bus in a convertor station, a first active power prediction value which is a sum of active power prediction values of loads in the convertor station, a first reactive power prediction value which is a sum of reactive power prediction values of the loads in the convertor station, an input amount of capacitors and reactors in the convertor station, terminal voltage prediction values of generators participating in a voltage control, active power prediction values of the generators and reactive power prediction values of the generators.

The inputting module 22 is configured to input the initial values into a preset control model for optimizing a model predictive control, wherein the preset control model comprises an objective function and constraint conditions, the objective function is a function established according to the voltage prediction values of the pilot buses and the terminal voltage prediction values of the generators, and configured to optimize terminal voltage setting values of the generators, the constraint conditions comprise a first constraint condition of the reactive power prediction values of the generators, a second constraint condition of the voltage prediction values of the pilot buses, the voltage prediction value of the bus in the convertor station, the terminal voltage prediction values of the generators, a third constraint condition of the input amount of the capacitors and reactors in the convertor station, a fourth constraint condition of an input amount of filter capacitors under a constant reactive power mode, a fifth constraint condition of a number of actions of the capacitors and reactors and a sixth constraint condition of a system voltage, the reactive power prediction values of the generators and the input amount of the capacitors and reactors in the convertor station.

The solving module 23 is configured to solve the preset control model to obtain a solution sequence of the terminal voltage setting values of the generators participating in the voltage control within a time window.

The sending module 24 is configured to send first values in the solution sequence to the generators, such that the voltage control in the near direct current area is realized.

In some embodiment, the apparatus further includes an establishing module, configured to establish the preset control model.

In some embodiment, the establishing module includes an establishing unit and an amending unit.

The establishing unit is configured to establish the objective function according to formula (1):

$$\min_{V_G^{set}} \sum_{i=0}^{N-1} \sum_{j=0}^{M-1} \rho^{t_{i,j}} F_1 \qquad (1)$$

where
$V_G^{set}$ represents the terminal voltage setting values of the generators, N represents a number of control cycles covered by the time window, M represents a number of predicted points in a single control cycle, $\rho$ represents an attenuation coefficient, $\rho<1$, $t_{i,j}=(Mi+j)\Delta t$ represents a prediction time corresponding to a $(j+1)^{th}$ predicted point in a $(i+1)^{th}$ control cycle, $\Delta t$ represents a time interval between prediction time corresponding to each two adjacent predicted points, $F_1$ represents a distance between the voltage prediction values of the pilot buses and voltage reference values of the pilot buses, wherein $F_1$ is denoted by formula (2):

$$F_1(t_{i,j})=\|V_{Pilot}^{pre}(t_{i,j})-V_{Pilot}^{ref}\|^2 \qquad (2)$$

where $F_1(t_{i,j})$ represents a distance between the voltage prediction values of the pilot buses and voltage reference values of the pilot buses at the prediction time $t_{i,j}$, $V_{Pilot}^{Pre}(t_{i,j})$ represents the voltage prediction values of the pilot buses at the prediction time $t_{i,j}$, $V_{Pilot}^{ref}$ represents the voltage reference values of the pilot buses;

a simplifying unit, configured to simplify the objective function according to formula (3) to obtain a simplified objective function, wherein the formula (3) is expressed as:

$$\min \sum_{i=0}^{N-1} \sum_{j=0}^{M-1} \rho^{t_{i,j}} F_2 \qquad (3)$$

where $F_2$ represents a distance between of the terminal voltage prediction values of the generators and terminal voltage setting values of the generators; $F_2$ is denoted by formula (4):

$$F_2(t_{i,j})=\|V_G^{pre}(t_{i,j})-V_G^{set}(t_{i,0})\|^2 \qquad (4)$$

where $F_2(t_{i,j})$ represents a distance between the terminal voltage prediction values of the generators and terminal voltage setting values of the generators at the predication time $t_{i,j}$, $V_G(t_{i,j})$ represents the terminal voltage prediction values of the generators at the predication time $t_{i,j}$, $V_G^{set}(t_{i,0})$ represents the terminal voltage setting values of the generators at a prediction time $t_{i,0}$, $t_{i,0}$ represents a prediction time corresponding to a first predicted point in the $(i+1)^{th}$ control cycle;

the simplified objective function is denoted by formula (5):

$$\min \sum_{i=0}^{N-1} \sum_{j=0}^{M-1} \rho^{t_{i,j}}(F_1 + wF_2) \qquad (5)$$

where w represents a weight corresponding to $F_2$.

Embodiments of the present disclosure further provide a non-transitory computer readable storage medium. The non-transitory computer readable storage medium according to embodiments of the present disclosure may include instructions that, when executed by a processor of an apparatus, causes the apparatus to execute a method for controlling a voltage in a direct current near area as above embodiments of the method.

The technical solutions provided by embodiments of the present disclosure have following advantageous effects.

In the technical solutions of the present disclosure, a switching prediction model of the reactive power of the generator and the capacitors and reactive resistors in the convertor station is designed, which may estimate state changes of the voltage in the direct current near area during a period of time. Comparing to the conventional method of using the current state as a control criterion, it is possible to achieve fast and slow coordination of the reactive devices during operation. With the method for controlling a voltage in a direct current near area according to embodiments of the present disclosure, which may be integrated into the automatic voltage control system operating in the control center, thus responding load fluctuations and changes of the DC transmission ways in the direct current near area.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in a almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present disclosure may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The non-transitory computer-readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for controlling a voltage in a near direct current area, wherein the method is applied in a control of an automatic voltage control system in a master station of a power system and comprises following steps:

collecting measured values of parameters as initial values of prediction values of the parameters, wherein the prediction values comprise voltage prediction values of pilot buses, a voltage prediction value of a bus in a convertor station, a first active power prediction value which is a sum of active power prediction values of loads in the convertor station, a first reactive power prediction value which is a sum of reactive power prediction values of the loads in the convertor station, an input amount of capacitors and reactors in the convertor station, terminal voltage prediction values of generators participating in a voltage control, active power prediction values of the generators and reactive power prediction values of the generators;

inputting the initial values into a preset control model for optimizing a model predictive control, wherein the preset control model comprises an objective function and constraint conditions, the objective function is a function established according to the voltage prediction values of the pilot buses and the terminal voltage prediction values of the generators, and configured to optimize terminal voltage setting values of generators, the constraint conditions comprise a first constraint condition of the reactive power prediction values of the generators, a second constraint condition of the voltage prediction values of the pilot buses, the voltage prediction value of the bus in the convertor station, the terminal voltage prediction values of the generators, a third constraint condition of the input amount of the capacitors and reactors in the convertor station, a fourth constraint condition of an input amount of filter capacitors under a constant reactive power mode, a fifth constraint condition of a number of actions of the capacitors and reactors and a sixth constraint condition of a system voltage, the reactive power prediction values of the generators and the input amount of the capacitors and reactors in the convertor station;

solving the preset control model to obtain a solution sequence of the terminal voltage setting values of the generators within a time window;

sending first values in the solution sequence to the generators, such that the voltage control in the near direct current area is realized.

2. The method according to claim 1, wherein the first active power prediction value, the first reactive power prediction value and the active power prediction values of the generators are evaluated according to a generation schedule and a load forecasting result.

3. The method according to claim 1, further comprising: establishing the preset control model.

4. The method according to claim 3, wherein establishing the preset control model comprises:

establishing the objective function according to formula (1):

$$\min_{V_G^{set}} \sum_{i=0}^{N-1} \sum_{j=0}^{M-1} \rho^{i,j} F_1 \quad (1)$$

where $V_G^{set}$ represents the terminal voltage setting values of the generators, N represents a number of control cycles covered by the time window, M represents a number of predicted points in a single control cycle, $\rho$ represents an attenuation coefficient, $\rho<1$, $t_{i,j}=(Mi+j)\Delta t$ represents a prediction time corresponding to a $(j+1)^{th}$ predicted point in a $(i+1)^{th}$ control cycle, $\Delta t$ represents a time interval between prediction time corresponding to each two adjacent predicted points, $F_1$ represents a distance between the voltage prediction values of the pilot buses and voltage reference values of the pilot buses, wherein $F_1$ is denoted by formula (2):

$$F_1(t_{i,j})=\|V_{Pilot}^{pre}(t_{i,j})-V_{Pilot}^{ref}\|^2 \quad (2)$$

where $F_1(t_{i,j})$ represents a distance between the voltage prediction values of the pilot buses and voltage reference values of the pilot buses at the prediction time $t_{i,j}$, $V_{Pilot}^{Pre}(t_{i,j})$ represents the voltage prediction values of the pilot buses at the prediction time $t_{i,j}$, $V_{Pilot}^{ref}$ represents the voltage reference values of the pilot buses;

simplifying the objective function according to formula (3) to obtain a simplified objective function, wherein the formula (3) is expressed as:

$$\min \sum_{i=0}^{N-1} \sum_{j=0}^{M-1} \rho^{i,j} F_2 \quad (3)$$

where $F_2$ represents a distance between the terminal voltage prediction values of the generators and terminal voltage setting values of the generators; $F_2$ is denoted by formula (4):

$$F_2(t_{i,j})=\|V_G^{pre}(t_{i,j})-V_G^{set}(t_{i,0})\|^2 \quad (4)$$

where $F_2(t_{i,j})$ represents a distance between the terminal voltage prediction values of the generators and terminal voltage setting values of the generators at the predication time $t_{i,j}$, $V_G^{pre}(t_{i,j})$ represents the terminal voltage prediction values of the generators at the predication time $t_{i,j}$, $V_G^{set}(t_{i,0})$ represents the terminal voltage setting values of the generators at a prediction time $t_{i,0}$, $t_{i,0}=(Mi)\Delta t$ represents a prediction time corresponding to a first predicted point in the $(i+1)^{th}$ control cycle;

the simplified objective function is denoted by formula (5):

$$\min \sum_{i=0}^{N-1} \sum_{j=0}^{M-1} \rho^{t_{i,j}}(F_1+wF_2) \quad (5)$$

where w represents a weight corresponding to $F_2$.

5. The method according to claim 4, wherein the first constraint condition is denoted by formula (6):

$$Q_G^{ref}(t_{i,j}) = \quad (6)$$

$$K_P[V_G^{pre}(t_{i,j}) - V_G^{set}(t_{i,0})] + K_I \Delta t \sum_{k=0}^{i \times M+j} [V_G^{pre}(t_{i,j-k}) - V_G^{set}(t_{i,-k})] +$$

$$Q_G^{pre}(t_{0,0}) - K_P[V_G^{pre}(t_{0,0}) - V_G^{set}(t_{0,0})]$$

$$Q_G^{pre}(t_{i,j}) = Q_G^{ref}(t_{i,j-1}) + [Q_G^{pre}(t_{i,j-1}) - Q_G^{ref}(t_{i,j-1})]e^{-(t_{i,j}-t_{i,j-1})/T_d}$$

where $Q_G^{ref}(t_{i,j})$ represents reactive power reference values of the generators at the prediction time $t_{i,j}$, $V_G^{pre}(t_{i,j-k})$ represents the terminal voltage prediction values of the generators at a prediction time $t_{i,j-k}$, $t_{i,j-k}=(Mi+j-k)\Delta t$, $V_G^{set}(t_{i,-k})$ represents the terminal voltage setting values of the generators at a prediction time $t_{i,-k}$, $t_{i,-k}=(Mi-k)\Delta t$, $Q_G^{pre}(t_{0,0})$ represents reactive power prediction values of the generators at a current time $t_{0,0}$, $V_G^{pre}(t_{0,0})$ represents the terminal voltage prediction values of the generators at the current time $t_{0,0}$, $V_G^{set}(t_{0,0})$ represents the terminal voltage setting values of the generators at the current time $t_{0,0}$, $K_I$ represents coefficients in a proportion calculation, $K_P$ represents coefficients in an integral calculation, $Q_G^{pre}(t_{i,j})$ is a component of $Q_G^{pre}(t_{i,j})$ and represents a reactive power prediction value of a generator at the prediction time $t_{i,j}$, $Q_G^{pre}(t_{i,j})$ represents the reactive power prediction values of the generators at the prediction time $t_{i,j}$, $Q_G^{ref}(t_{i,j-1})$ is a component of $Q_G^{ref}(t_{i,j-1})$ and represents a reactive power reference value of the generator at a prediction time $t_{i,j-1}$, $Q_G^{ref}(t_{i,j-1})$ represents the reactive power reference values of the generators at the prediction time $t_{i,j-1}$, $Q_G^{pre}(t_{i,j-1})$ is a component of $Q_G^{pre}(t_{i,j-1})$ and represents a reactive power prediction value of the generator at the prediction time $t_{i,j-1}$, $Q_G^{pre}(t_{i,j-1})$ represents the reactive power prediction values of the generators at the prediction time $t_{i,j-1}$, $t_{i,j-1}=(Mi+j-1)\Delta t$, $T_d$ represents an action delay of a generator excitation regulator.

6. The method according to claim 5, wherein the second constraint condition is denoted by formula (7)

$$V^{pre}(t_{i,j}) - V^{pre}(t_{0,0}) = \quad (7)$$

$$S \begin{bmatrix} P_G^{pre}(t_{i,j}) - P_G^{pre}(t_{0,0}) \\ Q_G^{pre}(t_{i,j}) - Q_G^{pre}(t_{0,0}) \\ -P_{St}^{pre}(t_{i,j}) + P_{St}^{pre}(t_{0,0}) \\ -Q_{St}^{pre}(t_{i,j}) + Q_{St}^{pre}(t_{0,0}) + Q_{St}^C[N_{St}^{pre}(t_{i,j}) - N_{St}^{pre}(t_{0,0})] \end{bmatrix}$$

where $V^{pre}(t_{i,j})$ represents a vector composing of the voltage prediction values of the pilot buses, the voltage prediction value of the bus in the convertor station and the terminal voltage prediction values of the generators at the prediction time $t_{i,j}$, $V^{pre}(t_{0,0})$ represents the vector composing of the voltage prediction values of the pilot buses, the voltage prediction value of the bus in the convertor station and the terminal voltage prediction values of the generators at the current time $t_{0,0}$, S represents a sensitivity matrix and is determined by the automatic voltage control system, $P_G^{pre}(t_{i,j})$ represents the active power prediction values of the generators at the prediction time $t_{i,j}$, $P_G^{pre}(t_{0,0})$ represents the active power prediction values of the generators at the current time $t_{0,0}$, $Q_G^{pre}(t_{0,0})$ represents the reactive power prediction values of the generators at the current time $t_{0,0}$, $P_{St}^{pre}(t_{i,j})$ represents the first active power prediction value at the prediction time $t_{i,j}$, $P_{St}^{pre}(t_{0,0})$ represents the first active power prediction value at the current time $t_{0,0}$, $Q_{St}^{pre}(t_{i,j})$ represents the first reactive power prediction value at the prediction time $t_{i,j}$, $Q_{St}^{pre}(t_{0,0})$ represents the first reactive power prediction value at the current time $t_{0,0}$, $Q_{St}^{C}$ represents a capacitance of a single capacitor, $N_{St}^{pre}(t_{i,j})$ represents the input amount of the capacitors and reactors in the convertor station at the prediction time $t_{i,j}$ and $N_{St}^{pre}(t_{0,0})$ represents the input amount of the capacitors and reactors in the convertor station at the current time $t_{0,0}$.

7. The method according to claim 6, wherein the third constraint condition is denoted by formula (8):

$$\hat{V}^{pre}(t_{i,j}) - V^{pre}(t_{0,0}) = \qquad (8)$$

$$S \begin{bmatrix} P_G^{pre}(t_{i,j}) - P_G^{pre}(t_{0,0}) \\ Q_G^{pre}(t_{i,j}) - Q_G^{pre}(t_{0,0}) \\ -P_{St}^{pre}(t_{i,j}) + P_{St}^{pre}(t_{0,0}) \\ -Q_{St}^{pre}(t_{i,j}) + Q_{St}^{pre}(t_{0,0}) + Q_{St}^{C}[N_{St}^{pre}(t_{i,j-1}) - N_{St}^{pre}(t_{0,0})] \end{bmatrix}$$

$$N_{St}^{pre}(t_{i,j}) = \begin{cases} N_{St}^{pre}(t_{i,j-1}) - 1, & \hat{V}_{St}^{pre} > V_{St}^{max} \\ N_{St}^{pre}(t_{i,j-1}) - 1, & \hat{V}_{St}^{pre} < V_{St}^{min} \\ N_{St}^{pre}(t_{i,j-1}), & \text{else} \end{cases}$$

where $\hat{V}^{pre}(t_{i,j})$ represents a vector composing of the voltage prediction values of the pilot buses, the voltage prediction value of the bus in the convertor station and the terminal voltage prediction values of the generators at the prediction time $t_{i,j}$ before an action is performed by the capacitors and reactors, S represents a sensitivity matrix and is determined by the automatic voltage control system, $N_{St}^{pre}(t_{i,j-1})$ represents the input amount of the capacitors and reactors in the convertor station at the prediction time $t_{i,j-1}$, $V_{St}^{max}$ represents an upper limit of the voltage prediction value of the bus in the convertor station, $V_{St}^{min}$ represents a lower limit of the voltage prediction value of the bus in the convertor station, $\hat{V}_{St}^{pre}$ is a component in $\hat{V}^{pre}$ and represents the voltage prediction value of the bus in the convertor station before an action is performed by the capacitors and reactors.

8. The method according to claim 7, wherein the fourth constraint condition is denoted by formula (9):

$$\hat{Q}_{St,out}^{pre} = -Q_{St}^{pre}(t_{i,j}) + Q_{St}^{C} N_{St}^{pre}(t_{i,j-1}) \qquad (9)$$

$$N_{St}^{pre}(t_{i,j}) = \begin{cases} N_{St}^{pre}(t_{i,j-1}) - 1, & \hat{Q}_{St,out}^{pre} > Q_{St,out}^{max} \\ N_{St}^{pre}(t_{i,j-1}) + 1, & \hat{Q}_{St,out}^{pre} < Q_{St,out}^{min} \\ N_{St}^{pre}(t_{i,j-1}), & \text{else} \end{cases}$$

where $\hat{Q}_{St,out}^{pre}$ represents a total reactive power injected into the power system by the converter station before an action of the filter capacitors, $Q_{St,out}^{max}$ represents an upper limit of the total reactive power injected into the power system by the converter station before an action of the filter capacitors, $Q_{St,out}^{min}$ represents a lower limit of the total reactive power injected into the power system by the converter station before an action of the filter capacitors.

9. The method according to claim 8, wherein the fifth constraint condition is denoted by formula (10):

$$-O_{St}^{pre}(t_{i,j}) \leq N_{St}^{pre}(t_{i,j}) - N_{St}^{pre}(t_{i,j-1}) \leq O_{St}^{pre}(t_{i,j}) \qquad (10)$$

$$\sum_{i=0}^{N-1} \sum_{j=0}^{M-1} O_{St}^{pre}(t_{i,j}) \leq O_{St}^{max}$$

where $O_{St}^{pre}(t_{i,j})$ is an indicator indicating whether the capacitors and reactors are static at the prediction time $t_{i,j}$, $O_{St}^{max}$ or represents an upper limit of the number of actions of the capacitors and reactors.

10. The method according to claim 9, wherein the sixth constraint condition is denoted by formula (11)

$$\begin{cases} V^{min} \leq V^{pre}(t_{i,j}) \leq V^{max} \\ Q_G^{min} \leq Q_G^{pre}(t_{i,j}) \leq Q_G^{max} \\ N_{St}^{min} \leq N_{St}^{pre}(t_{i,j}) \leq N_{St}^{max} \end{cases} \qquad (11)$$

where $V^{max}$ represents upper limits of the vector composing of the voltage prediction values of the pilot buses, the voltage prediction value of the bus in the convertor station and the terminal voltage prediction values of the generators, $V^{min}$ represents lower limits of the vector composing of the voltage prediction values of the pilot buses, the voltage prediction value of the bus in the convertor station and the terminal voltage prediction values of the generators, $Q_G^{max}$ represents upper limits of the reactive power prediction values of the generators, $Q_G^{min}$ represents lower limits of the reactive power prediction values of the generators, $N_{St}^{max}$ represents an upper limit of the input amount of the capacitors and reactors and $N_{St}^{min}$ represents a lower limit of the input amount of the capacitors and reactors.

11. An apparatus for controlling a voltage in a near direct current area, wherein the apparatus is applied in a control of an automatic voltage control system in a master station of a power system and comprises:

a processor; and a memory for storing instructions executable by the processor;

wherein the processor is configured to collect measured values of parameters as initial values of prediction values of the parameters, wherein the prediction values comprise voltage prediction values of pilot buses, a voltage prediction value of a bus in a convertor station, a first active power prediction value which is a sum of active power prediction values of loads in the convertor station, a first reactive power prediction value which is a sum of reactive power prediction values of the loads in the convertor station, an input amount of capacitors and reactors in the convertor station, terminal voltage prediction values of generators participating in a voltage control, active power prediction values of the generators and reactive power prediction values of the generators;

input the initial values into a preset control model for optimizing a model predictive control, wherein the preset control model comprises an objective function and constraint conditions, the objective function is a function established according to the voltage prediction values of the pilot buses and the terminal voltage prediction values of the generators, and configured to optimize terminal voltage setting values of the generators, the constraint conditions comprise a first constraint condition of the reactive power prediction values of the generators, a second constraint condition of the voltage prediction values of the pilot buses, the voltage prediction value of the bus in the convertor station, the terminal voltage prediction values of the generators, a third constraint condition of the input amount of the capacitors and reactors in the convertor station, a fourth constraint condition of an input amount of filter capacitors under a constant reactive power mode, a fifth constraint condition of a number of actions of the capacitors and reactors and a sixth constraint condition of a system voltage, the reactive power prediction values of the generators and the input amount of the capacitors and reactors in the convertor station;

solve the preset control model to obtain a solution sequence of the terminal voltage setting values of the generators within a time window;

send first values in the solution sequence to the generators, such that the voltage control in the near direct current area is realized.

12. The apparatus according to claim 11, the processor is further configured to:

establish the preset control model.

13. The apparatus according to claim 12, wherein the processor is further configured to:

establish the objective function according to formula (1):

$$\min_{V_G^{set}} \sum_{i=0}^{N-1} \sum_{j=0}^{M-1} \rho^{i,j} F_1 \tag{1}$$

where $V_G^{set}$ represents the terminal voltage setting values of the generators, N represents a number of control cycles covered by the time window, M represents a number of predicted points in a single control cycle, $\rho$ represents an attenuation coefficient, $\rho<1$, $t_{i,j}=(Mi+j)\Delta t$ represents a prediction time corresponding to a $(j+1)^{th}$ predicted point in a $(i+1)^{th}$ control cycle, $\Delta t$ represents a time interval between prediction time corresponding to each two adjacent predicted points, $F_1$ represents a distance between the voltage prediction values of the pilot buses and voltage reference values of the pilot buses, wherein $F_1$ is denoted by formula (2):

$$F_1(t_{i,j})=\|V_{Pilot}^{pre}(t_{i,j})-V_{Pilot}^{ref}\|^2 \tag{2}$$

where $F_1(t_{i,j})$ represents a distance between the voltage prediction values of the pilot buses and voltage reference values of the pilot buses at the prediction time $t_{i,j}$, $V_{Pilot}^{Pre}(t_{i,j})$ represents the voltage prediction values of the pilot buses at the prediction time $t_{i,j}$, $V_{Pilot}^{ref}$ represents the voltage reference values of the pilot buses;

simplify the objective function according to formula (3) to obtain a simplified objective function, wherein the formula (3) is expressed as:

$$\min \sum_{i=0}^{N-1} \sum_{j=0}^{M-1} \rho^{i,j} F_2 \tag{3}$$

where $F_2$ represents a distance between the terminal voltage prediction values of the generators and terminal voltage setting values of the generators; $F_2$ is denoted by formula (4):

$$F_2(t_{i,j})=\|V_G^{pre}(t_{i,j})-V_G^{set}(t_{i,0})\|^2 \tag{4}$$

where $F_2(t_{i,j})$ represents a distance between the terminal voltage prediction values of the generators and terminal voltage setting values of the generators at the predication time $t_{i,j}$, $V_G^{pre}(t_{i,j})$ represents the terminal voltage prediction values of the generators at the predication time $t_{i,j}$, $V_G^{set}(t_{i,0})$ represents the terminal voltage setting values of the generators at a prediction time $t_{i,0}$, $t_{i,0}=(Mi)\Delta t$ represents a prediction time corresponding to a first predicted point in the $(i+1)^{th}$ control cycle;

the simplified objective function is denoted by formula (5):

$$\min \sum_{i=0}^{N-1} \sum_{j=0}^{M-1} \rho^{i,j}(F_1+wF_2) \tag{5}$$

where w represents a weight corresponding to $F_2$.

14. The apparatus according to claim 13, wherein the first constraint condition is denoted by formula (6):

$$Q_G^{ref}(t_{i,j}) = \tag{6}$$

$$K_P[V_G^{pre}(t_{i,j}) - V_G^{set}(t_{i,0})] + K_I \Delta t \sum_{k=0}^{i \times M+j} [V_G^{pre}(t_{i,j-k}) - V_G^{set}(t_{i,-k})] +$$

$$Q_G^{pre}(t_{0,0}) - K_P[V_G^{pre}(t_{0,0}) - V_G^{set}(t_{0,0})]$$

$$Q_G^{pre}(t_{i,j}) = Q_G^{ref}(t_{i,j-1}) + [Q_G^{pre}(t_{i,j-1}) - Q_G^{ref}(t_{i,j-1})]e^{-(t_{i,j}-t_{i,j-1})/T_d}$$

where $Q_G^{ref}(t_{i,j})$ represents reactive power reference values of the generators at the prediction time $t_{i,j}$, $V_G^{pre}(t_{i,j-k})$ represents the terminal voltage prediction values of the generators at a prediction time $t_{i,j-k}$, $t_{i,j-k}=(Mi+j-k)\Delta t$, $V_G^{set}(t_{i,-k})$ represents the terminal voltage setting values of the generators at a prediction time $t_{i,-k}$, $t_{i,-k}=(Mi-k)\Delta t$, $Q_G^{pre}(t_{0,0})$ represents reactive power prediction values of the generators at a current time $t_{0,0}$, $V_G^{pre}(t_{0,0})$ represents the terminal voltage prediction values of the generators at the current time $t_{0,0}$, $V_G^{set}(t_{0,0})$ represents the terminal voltage setting values of the generators at the current time $t_{0,0}$, $K_I$ represents coefficients in a proportion calculation, $K_P$ represents coefficients in an integral calculation, $Q_G^{pre}(t_{i,j})$ is a component of $Q_G^{pre}(t_{i,j})$ and represents a reactive power prediction value of a generator at the prediction time $t_{i,j}$, $Q_G^{ref}(t_{i,j-1})$ represents the reactive power prediction values of the generators at the prediction time $t_{i,j}$, $Q_G^{ref}(t_{i,j-1})$ is a component of $Q_G^{ref}(t_{i,j-1})$ and represents a reactive power reference value of the generator at a prediction time $t_{i,j-1}$, $Q_G^{ref}(t_{i,j-1})$ represents the reactive power reference values of the generators at the prediction time $t_{i,j-1}$, $Q_G^{pre}(t_{i,j-1})$ is a component of $Q_G^{pre}(t_{i,j-1})$ and represents a reactive power prediction value of the generator at the prediction time $t_{i,j-1}$, $Q_G^{pre}(t_{i,j-1})$ represents the reactive power prediction values of the generators at the prediction time $t_{i,j-1}$, $t_{i,j-1}=(Mi+j-1)\Delta t$, $T_d$ represents an action delay of a generator excitation regulator.

15. The apparatus according to claim 14 wherein the second constraint condition is denoted by formula (7):

$$V^{pre}(t_{i,j}) - V^{pre}(t_{0,0}) = S \begin{bmatrix} P_G^{pre}(t_{i,j}) - P_G^{pre}(t_{0,0}) \\ Q_G^{pre}(t_{i,j}) - Q_G^{pre}(t_{0,0}) \\ -P_{St}^{pre}(t_{i,j}) + P_{St}^{pre}(t_{0,0}) \\ -Q_{St}^{pre}(t_{i,j}) + Q_{St}^{pre}(t_{0,0}) + Q_{St}^C[N_{St}^{pre}(t_{i,j}) - N_{St}^{pre}(t_{0,0})] \end{bmatrix} \quad (7)$$

where $V^{pre}(t_{i,j})$ represents a vector composing of the voltage prediction values of the pilot buses, the voltage prediction value of the bus in the convertor station and the terminal voltage prediction values of the generators at the prediction time $t_{i,j}$, $V^{pre}(t_{0,0})$ represents the vector composing of the voltage prediction values of the pilot buses, the voltage prediction value of the bus in the convertor station and the terminal voltage prediction values of the generators at the current time $t_{0,0}$, S represents a sensitivity matrix and is determined by the automatic voltage control system, $P_G^{pre}(t_{i,j})$ represents the active power prediction values of the generators at the prediction time $t_{i,j}$, $P_G^{pre}(t_{0,0})$ represents the active power prediction values of the generators at the current time $t_{0,0}$, $Q_G^{pre}(t_{0,0})$ represents the reactive power prediction values of the generators at the current time $t_{0,0}$, $P_{St}^{pre}(t_{i,j})$ represents the first active power prediction value at the prediction time $t_{i,j}$, $P_{St}^{pre}(t_{0,0})$ represents the first active power prediction value at the current time $t_{0,0}$, $Q_{St}^{pre}(t_{i,j})$ represents the first reactive power prediction value at the prediction time $t_{i,j}$, $Q_{St}^{pre}(t_{0,0})$ represents the first reactive power prediction value at the current time $t_{0,0}$, $Q_{St}^C$ represents a capacitance of a single capacitor, $N_{St}^{pre}(t_{i,j})$ represents the input amount of the capacitors and reactors in the convertor station at the prediction time $t_{i,j}$ and $N_{St}^{pre}(t_{0,0})$ represents the input amount of the capacitors and reactors in the convertor station at the current time $t_{0,0}$.

16. The apparatus according to claim 15, wherein the third constraint condition is denoted by formula (8):

$$\hat{V}^{pre}(t_{i,j}) - V^{pre}(t_{0,0}) = \quad (8)$$

$$S \begin{bmatrix} P_G^{pre}(t_{i,j}) - P_G^{pre}(t_{0,0}) \\ Q_G^{pre}(t_{i,j}) - Q_G^{pre}(t_{0,0}) \\ -P_{St}^{pre}(t_{i,j}) + P_{St}^{pre}(t_{0,0}) \\ -Q_{St}^{pre}(t_{i,j}) + Q_{St}^{pre}(t_{0,0}) + Q_{St}^C[N_{St}^{pre}(t_{i,j-1}) - N_{St}^{pre}(t_{0,0})] \end{bmatrix}$$

$$N_{St}^{pre}(t_{i,j}) = \begin{cases} N_{St}^{pre}(t_{i,j-1}) - 1, & \hat{V}_{St}^{pre} > V_{St}^{max} \\ N_{St}^{pre}(t_{i,j-1}) - 1, & \hat{V}_{St}^{pre} < V_{St}^{min} \\ N_{St}^{pre}(t_{i,j-1}), & \text{else} \end{cases}$$

where $\hat{V}^{pre}(t_{i,j})$ represents a vector composing of the voltage prediction values of the pilot buses, the voltage prediction value of the bus in the convertor station and the terminal voltage prediction values of the generators at the prediction time $t_{i,j}$ before an action is performed by the capacitors and reactors, S represents a sensitivity matrix and is determined by the automatic voltage control system, $N_{St}^{pre}(t_{i,j-1})$ represents the input amount of the capacitors and reactors in the convertor station at the prediction time $t_{i,j-1}$, $V_{St}^{max}$ represents an upper limit of the voltage prediction value of the bus in the convertor station, $V_{St}^{min}$ represents a lower limit of the voltage prediction value of the bus in the convertor station, $\hat{V}_{St}^{pre}$ is a component in $\hat{V}^{pre}$ and represents the voltage prediction value of the bus in the convertor station before an action is performed by the capacitors and reactors.

17. The apparatus according to claim 16, wherein the fourth constraint condition is denoted by formula (9):

$$\hat{Q}_{St,out}^{pre} = -Q_{St}^{pre}(t_{i,j}) + Q_{St}^C N_{St}^{pre}(t_{i,j-1}) \quad (9)$$

$$N_{St}^{pre}(t_{i,j}) = \begin{cases} N_{St}^{pre}(t_{i,j-1}) - 1, & \hat{Q}_{St,out}^{pre} > Q_{St,out}^{max} \\ N_{St}^{pre}(t_{i,j-1}) + 1, & \hat{Q}_{St,out}^{pre} < Q_{St,out}^{min} \\ N_{St}^{pre}(t_{i,j-1}), & \text{else} \end{cases}$$

where $\hat{Q}_{St,out}^{pre}$ represents a total reactive power injected into the power system by the converter station before an action of the filter capacitors, $Q_{St,out}^{max}$ represents an upper limit of the total reactive power injected into the power system by the converter station before an action of the filter capacitors, $Q_{St,out}^{min}$ represents a lower limit of the total reactive power injected into the power system by the converter station before an action of the filter capacitors.

18. The apparatus according to claim 17, wherein the fifth constraint condition is denoted by formula (10):

$$-O_{St}^{pre}(t_{i,j}) \leq N_{St}^{pre}(t_{i,j}) - N_{St}^{pre}(t_{i,j-1}) \leq O_{St}^{pre}(t_{i,j}) \quad (10)$$

$$\sum_{i=0}^{N-1} \sum_{j=0}^{M-1} O_{St}^{pre}(t_{i,j}) \leq O_{St}^{max}$$

where $O_{St}^{pre}(t_{i,j})$ is an indicator indicating whether the capacitors and reactors are static at the prediction time $t_{i,j}$, $O_{St}^{max}$ or represents an upper limit of the number of actions of the capacitors and reactors.

19. The apparatus according to claim 18, wherein the sixth constraint condition is denoted by formula (11):

$$\begin{cases} V^{min} \leq V^{pre}(t_{i,j}) \leq V^{max} \\ Q_G^{min} \leq Q_G^{pre}(t_{i,j}) \leq Q_G^{max} \\ N_{St}^{min} \leq N_{St}^{pre}(t_{i,j}) \leq N_{St}^{max} \end{cases} \quad (11)$$

where $V^{max}$ represents upper limits of the vector composing of the voltage prediction values of the pilot buses, the voltage prediction value of the bus in the convertor station and the terminal voltage prediction values of the generators, $V^{min}$ represents lower limits of the vector composing of the voltage prediction values of the pilot buses, the voltage prediction value of the bus in the convertor station and the terminal voltage prediction values of the generators, $Q_G^{max}$ represents upper limits of the reactive power prediction values of the generators, $Q_G^{min}$ represents lower limits of the reactive power prediction values of the generators, $N_{St}^{max}$ represents an upper limit of the input amount of the capacitors and reactors and $N_{St}^{min}$ represents a lower limit of the input amount of the capacitors and reactors.

20. A non-transitory computer-readable storage medium having stored therein instructions that, when executed by a processor of a computer, causes the computer to perform a method for controlling a voltage in a near direct current area, the method comprising:

collecting measured values of parameters as initial values of prediction values of the parameters, wherein the prediction values comprise voltage prediction values of pilot buses, a voltage prediction value of a bus in a convertor station, a first active power prediction value which is a sum of active power prediction values of loads in the convertor station, a first reactive power prediction value which is a sum of reactive power prediction values of the loads in the convertor station, an input amount of capacitors and reactors in the convertor station, terminal voltage prediction values of generators participating in a voltage control active power prediction values of the generators and reactive power prediction values of the generators;

inputting the initial values into a preset control model for optimizing a model predictive control, wherein the preset control model comprises an objective function and constraint conditions, the objective function is a function established according to the voltage prediction values of the pilot buses and the terminal voltage prediction values of the generators, and configured to optimize terminal voltage setting values of generators, the constraint conditions comprise a first constraint condition of the reactive power prediction values of the generators, a second constraint condition of the voltage prediction values of the pilot buses, the voltage prediction value of the bus in the convertor station, the terminal voltage prediction values of the generators, a third constraint condition of the input amount of the capacitors and reactors in the convertor station, a fourth constraint condition of an input amount of filter capacitors under a constant reactive power mode, a fifth constraint condition of a number of actions of the capacitors and reactors and a sixth constraint condition of a system voltage, the reactive power prediction values of the generators and the input amount of the capacitors and reactors in the convertor station;

solving the preset control model to obtain a solution sequence of the terminal voltage setting values of the generators within a time window;

sending first values in the solution sequence to the generators, such that the voltage control in the near direct current area is realized.

* * * * *